Sept. 21, 1937.  W. A. PURTELL  2,093,646
METHOD OF AND APPARATUS FOR MAKING COLD FORMED SOCKETED SCREWS
Filed Oct. 6, 1934  3 Sheets-Sheet 1
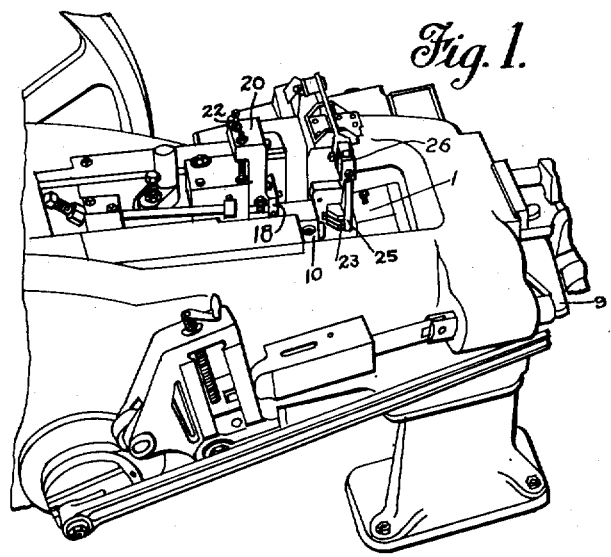
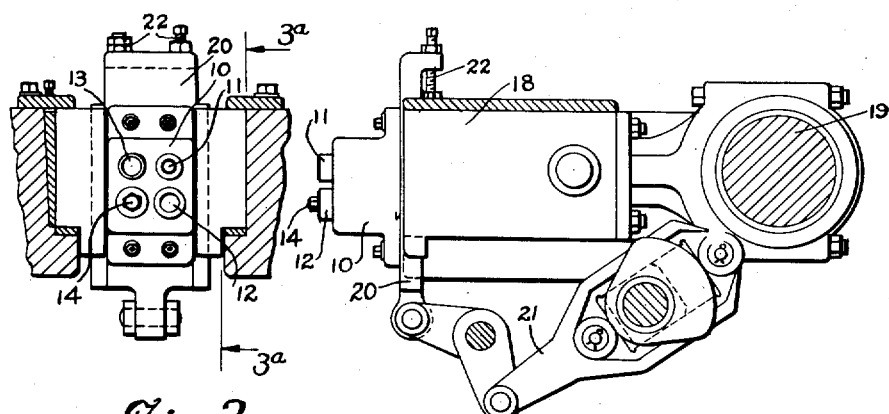
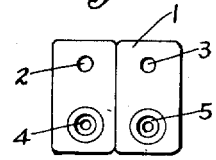
Inventor
WILLIAM A. PURTELL
By
Attorney Sept. 21, 1937.   W. A. PURTELL   2,093,646
METHOD OF AND APPARATUS FOR MAKING COLD FORMED SOCKETED SCREWS
Filed Oct. 6, 1934   3 Sheets-Sheet 2
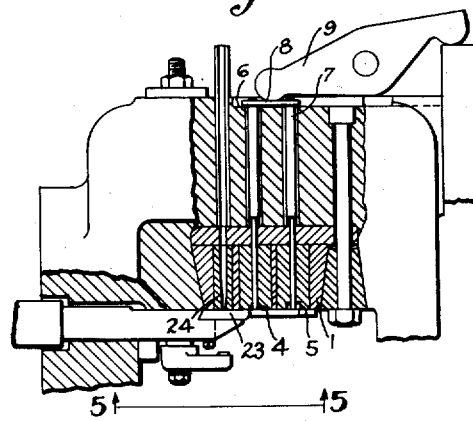
Fig. 4.
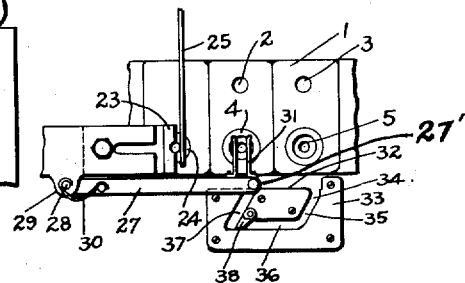
Fig. 5.
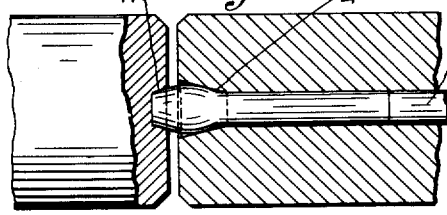
Fig. 6.
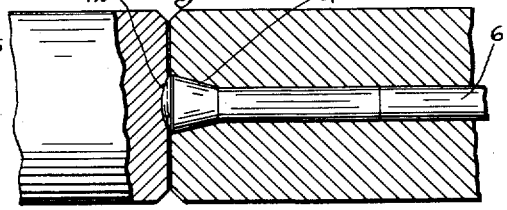
Fig. 7.
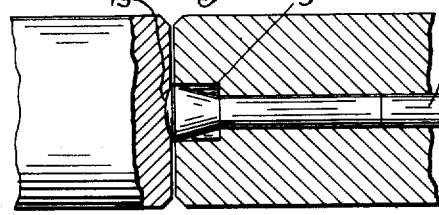
Fig. 8.
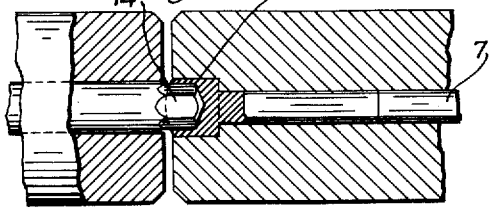
Fig. 9.
Fig. 10.   Fig. 10.ᵃ
Inventor
WILLIAM A. PURTELL
By
Attorney Sept. 21, 1937.    W. A. PURTELL    2,093,646
METHOD OF AND APPARATUS FOR MAKING COLD FORMED SOCKETED SCREWS
Filed Oct. 6, 1934    3 Sheets-Sheet 3
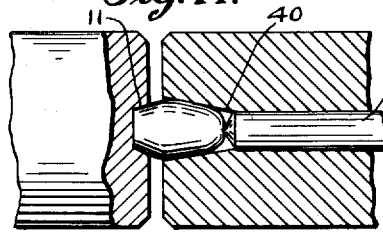
Fig. 11.
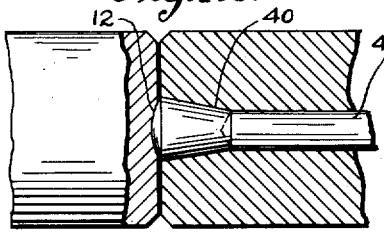
Fig. 12.
Fig. 15.
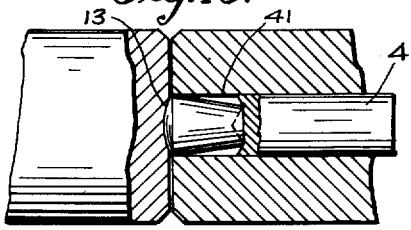
Fig. 13.
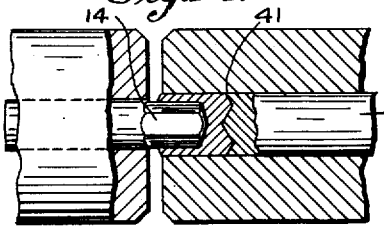
Fig. 14.
Fig. 15a.
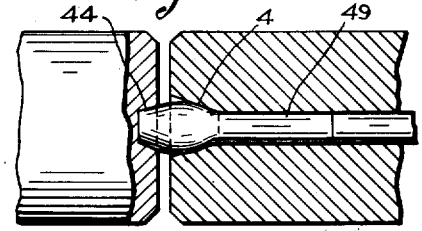
Fig. 16.
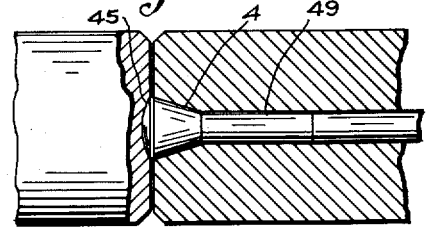
Fig. 17.
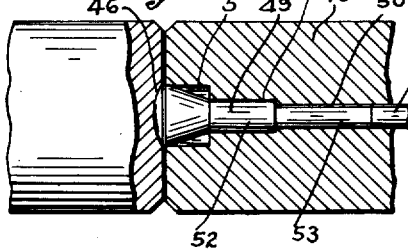
Fig. 18.
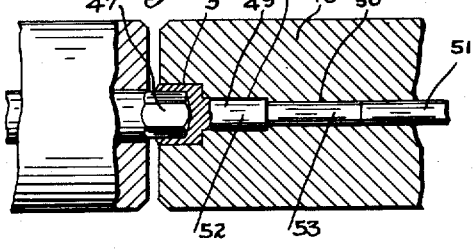
Fig. 19.

Fig. 20a.
Inventor
WILLIAM A. PURTELL
By
Attorney

Patented Sept. 21, 1937

2,093,646

UNITED STATES PATENT OFFICE 2,093,646

METHOD OF AND APPARATUS FOR MAKING COLD FORMED SOCKETED SCREWS

William A. Purtell, Hartford, Conn., assignor to The Holo-Krome Screw Corporation, a corporation of Connecticut Application October 6, 1934, Serial No. 747,178

38 Claims. (Cl. 10—12)

My invention relates to methods of and apparatus for making cold formed socketed screws.

It has heretofore been proposed to make cold formed socketed cap and set screws with an annealing operation between the upsetting operation and the socketing operation, this annealing operation being believed to be desirable to normalize or soften the usual high carbon alloy steel after the same has hardened following the upsetting operation and thus prepare the same for socketing. As a result, considerable delay and handling has been required and it has been necessary to incur considerable expense in annealing, while the latter also presents certain hazards, such as the decarburization of surface or marring of surface, or non-uniformity of annealing results, frequently encountered in annealing. Further, in making either socketed cap or set screws irrespective of the size thereof, it has heretofore been the practice to perform the upsetting operation on one machine and the socketing operation on another, with a consequent necessity for operators for both, and a further necessity for an inventory sufficient to permit both to operate, with, of course, also, a lack of uniformity in the product.

My invention has among its objects to provide an improved method of making such screws whereby it is made possible substantially to reduce the cost of making the same and to eliminate handling and delay while producing a superior product. A more specific object of my invention is to provide an improved method of making such screws whereby it is made possible to eliminate the annealing operation heretofore believed to be desirable before socketing, while at the same time eliminating the cost and delays incident to annealing and the hazards of annealing which affect the cost and quality of the product. A further object of my invention is to produce an improved apparatus for making such screws whereby through improved mechanism for effecting handling of the blank and the operations thereon in an improved manner, it is made possible to eliminate annealing while speeding up the production very substantially, eliminating one of the machines required in production, and reducing the necessary inventory, while also producing a more uniform product. Another object is to produce an improved fillister screw having the desired continuous compacted fibrous structure adjacent the socket and an improved shank especially adapted to roll threading. These and other objects and advantages of my improvements will, however, hereinafter more fully appear.

In the accompanying drawings I have shown for purposes of illustration certain embodiments of mechanism for practicing my improved method.

In these drawings,—

Figure 1 is a perspective view of a header equipped with my improvements, only a portion of the header being illustrated to facilitate illustration;

Fig. 2 is an enlarged detail face view of the die block;

Fig. 3 is a face view of the punch block on a smaller scale;

Fig. 3a is a sectional view on line 3a—3a of Figure 3 showing the punch and gate operating mechanism;

Fig. 4 is a plan view of the header portion at the right in Figure 1, certain portions being broken away to show the die block and associated mechanism;

Fig. 5 is a detail view of the transfer mechanism on a larger scale than Figure 4, from the direction of the arrows 5—5 thereon;

Figs. 6, 7, 8 and 9 are sectional views of the punches and dies used in upsetting and socketing a fillister screw;

Figs. 10 and 10a show plan and side views of such a screw;

Figs. 11, 12, 13 and 14 show the punches and dies used in upsetting and socketing set screws;

Figs. 15 and 15a show plan and side elevational views of such a set screw;

Figure 20:
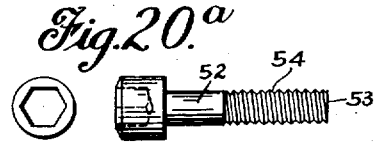

Figs. 16, 17, 18 and 19 show the punches and dies used in upsetting and socketing a modified form of fillister screw having an extruded shank suitable for roll threading, and Figs. 20 and 20a are views similar to Figs. 15 and 15a showing a fillister screw produced by the mechanism of Figures 16–19, and subsequently roll threaded.

In carrying out my improved method, it is important that the socketing operation be performed before there is a permanent change of character of the metal following heading, such as is evidenced by a loss of heat. If socketing follows upsetting before this change of character or loss of heat occurs, it is found that annealing between the upsetting and socketing operations may be eliminated. As a result, it is possible not only materially to reduce the cost of production through eliminating this expensive operation, but also to eliminate delay and speed up the production, while also eliminating the losses incident to the hazards of annealing.

In the machine shown in Figures 1 to 5, it will be noted that I have therein illustrated a well known Waterbury-Farrell double stroke solid die header, the latter including an improved construction whereby it is made possible for the same to carry out my improved method of eliminating any need for annealing between upsetting and socketing by transferring the blank from the upsetting to the socketing dies within the desired time limit, all as hereinafter more fully appears.

Referring more particularly to this header construction, it will be noted that it includes an improved double die block, generally indicated at 1. This block 1, while carried in a usual position, has two top apertures 2 and 3 therein for receipt of a top punch hereinafter described and also bottom die apertures 4 and 5, of which 4 is a blanking die used during the upsetting operation as hereinafter described, and 5 is a finishing die used in the socketing operation as hereinafter described. Note also that herein a knockout pin 6 is disposed inside the die aperture 4 and another knockout pin 7 inside the die aperture 5. Further, these pins 6 and 7 are parallel with one another as illustrated in Figure 4 and suitably connected at their upper end for simultaneous operation by any suitable means, as by a cross link or bar 8, operated in the usual manner by a usual knockout actuating cam 9, herein acting on the connection 8 midway between the ends thereof. Thus it will be evident that mechanism is provided for simultaneously knocking out the work in the upsetting and socketing die apertures 4 and 5.

Operatively associated with this die block 1 is also improved punch mechanism, herein including a punch block 10 mounted, as hereinafter described, opposite the die block 1 and carrying a plurality of punches adapted to cooperate with the aperture means in the die block when a screw is being formed in the latter. Herein, these punches include (1) a punch 11 having an upsetting aperture adapted to effect initial upsetting on a blank in its initial form (a cylindrical blank of uniform diameter and suitable length cut off the wire roll), as hereinafter described, (2) a further punch 12 having a more shallow crowning aperture adapted to complete the upsetting operation and herein arranged vertically under the punch 11, (3) a third punch 13 having an aperture therein similar to the aperture of punch 12 disposed in the same horizontal planes with the punch 11 and laterally offset with respect thereto, and (4) a fourth punch 14 in the form of a projecting socketing punch, herein hexagonal and disposed beneath the punch 13. Further, it will be noted that two sets of punches are provided, of which 11 and 13 are disposed laterally offset in the same upper horizontal planes, while 12 and 14 are similarly disposed in common lower horizontal planes, all as shown in Figure 3.

Referring more particularly to the mounting of the block 10, it will be noted that, as shown in Figures 3 and 3a, the same is horizontally reciprocable with a head 18 on the header connected by a pitman to a suitable rotating shaft 19 of the header. Moreover, it will be noted that the block 10 is suitably removably carried on a gate 20 vertically adjustable across the path of the head 18 and operated from the header through usual gate operating linkage, indicated at 21. Herein, it will also be noted that adjustable screws 22 limit the movement of the gate in a usual manner. Through the provision of this gate mechanism and the disposition of the punches 11, 12, 13 and 14 on the block 10, which moves with the gate, it will be evident that it is made possible for the punches 11, 13 to function in one vertical position of the gate and for the punches 12, 14 to function in another vertical position of the latter, while all of the same are automatically operative from the header in the course of operation of the latter.

Next referring to the mechanism for cutting off the slugs from the wire and automatically transferring the same to the die aperture 4, attention is directed to Figures 4 and 5. There, it will be noted that a usual form of knife 23 is provided connected in a usual manner to the header mechanism and, as usual, reversely reciprocable transversely of the die block 1 as indicated in Figure 5. As in a usual construction, this knife 23 also moves first across the end of a quill 24, through which the stock is fed, in such manner that the knife 23 cuts off the desired short length of wire of uniform cross section, while the cut-off slug is positioned by a spring finger 25 of the fiddle bow mechanism, generally indicated 26, the spring 25 being disposed in the usual manner on the opposite side of the slug from the end of the knife 23. Further, the spring 25 is adapted in a usual manner to remain in this relation to the knife to position the slug while the latter is moved with the knife 23 from opposite the quill 24 to opposite the upsetting die aperture 4. Thus it will be evident that, with the slug positioned opposite this aperture 4, it will be ready to be operated upon first by the punch 11 and then by the punch 12.

Operatively associated with the knife 23 and spring 25 is also improved transfer mechanism adapted, after upsetting, to effect transfer of the blank from die aperture 4 to die aperture 5 for socketing in the latter. Herein, this includes a rockable slide 27 (Fig. 5) pivoted at 28 on a depending projection 29 on the under side of the knife 23 and constantly urged downward by a spring 30, suitably connected between the slide 27 and the projection 29. This slide 27, as shown, thus moves with the knife 23 and extends forward beyond the front end of the knife and the spring 25. Also, it carries on its upper surface upstanding spaced spring fingers 31, forming a blank engaging clip, and these fingers 31 are so disposed that when the knife 23 and spring 25 are in the position shown in Figure 5, these fingers 31 are spaced equally on opposite sides of the die aperture 4.

In the above described movement, it will also be noted that a lateral or roller cam 27' on the extremity of the slide 27 slides on a top surface 32 formed on a suitable guiding member 33 suitably mounted below the quill 24 and die apertures 4 and 5. Thus, with the parts disposed as in Figure 5, when the knife 23 moves forward, or to the right, from the position illustrated, i. e. to carry a slug from opposite the quill 24 to opposite the die aperture 4, these spring fingers 31, if initially in the position illustrated, opposite the die aperture 4, will carry a blank projected out of the latter by the knock-out pin 6, laterally to the right, i. e. to opposite the die aperture 5, the latter aperture, as shown, being spaced the same distance from the aperture 4 that the latter aperture is spaced from the quill. In other words, as a new slug is cut off, a blank ejected from die aperture 4 will be transferred opposite die aperture 5 ready to be operated on by punches 13 and 14 which will, respectively, push the blank into the aperture 5 and socket the blank therein.

Improved means are herein also provided for controlling the transfer slide 27 and returning the same from a position opposite the die aperture 5 to a position opposite the die aperture 4 at the proper time. Here, it will be noted that the surface 32 is cut away as shown at 34 to permit the fingers 31 to drop away. Further, a downward and angularly disposed guide 35 extends from the cut away portion 34 downward and to the left (Figure 5) and in turn communicates at its bottom with a similar guide 36 horizontally disposed near the bottom of the guide block 33, while the guide 36 in turn communicates with an upwardly disposed guide 37 which extends upward and to the right to a point under the die aperture 4. It will also be noted that in the guide 36 and adjacent the junction of the latter with the guide 37, a catch 38 is provided which will prevent the slide 27 from moving to the right along guide 36 and require the slide 27 to move upwardly along guide 37 in such manner as to require the fingers 31 to be brought into engagement with the blank ejected from die aperture 4.

As regards operation and timing, it will be understood that the knife 23 and fiddle bow spring 25 will move the cut stock from the quill 24 over opposite die aperture 4, while the fingers 31 are moved from opposite the latter die aperture to opposite die aperture 5. Moreover, it will be noted that after the slide 27 and fingers 31 have moved down through guides 35 and 36 to a position in engagement with catch 38, the punches 11 and 12 will successively operate upon the blank in die aperture 4. Then the slide 27 and fingers 31 will move up into the position shown in Figure 5 and engage the upset blank pushed out by knockout pin 6, and transfer it to die aperture 5, and, thereafter, return through guides 35, 36 to engagement with the catch 38 before the punch 13 has completed its operation and before punch 14 begins operation on the blank in the die aperture 5. Here, also, it will be understood that the punch 13 will first engage the blank ready to position the same in the die aperture 5 before the fingers 31 will release the blank and that the timing of the knockout pins 6 and 7 is such that these will both be actuated after the punch 12 has operated and after the punch 14 has operated. It will, of course, also be understood that after the blanks have been socketed, they will be ejected by pin 7 from the socketing die aperture 5, and fall into a suitable chute or receptacle, not shown.

In this application, I have shown in Figures 6, 7, 8 and 9, punches and dies of a suitable construction for fillister screws, the same being generally of the improved construction described and claimed in co-pending applications, Ser. No. 542,077, filed June 4, 1931, now Patent No. 1,978,371, and Ser. No. 601,549, filed March 28, 1932, now Patent No. 1,978,372. This structure makes it possible to upset and socket the blank while cold. Further, it produces by upsetting the blank of my application, Serial No. 601,549, which is shown in Figure 7 herein as externally progressively relieved to below the bottom of the socket to be formed therein. It also produces during socketing while the metal is forced in advance of the punch and free to flow laterally as in my previous applications, an article, such as that shown in Figure 10, having the improved non-extruded, continuous, unstretched, compacted fibrous structure in the head, at least as strong as the fibers in the shank, which are also non-extruded fibers of normal strength, all as described and claimed in the above co-pending applications. Further, it will be understood that instead of fillister screws, such as illustrated in Figure 10, socketed set screws may be made by using punches 11, 12, 13 and 14, or substituting like punches, and using different co-operating dies having modified die apertures 40 and 41, also described in the second application mentioned, during the forming operations; different knockout pins 42 and 43 then being used in connection with the upsetting and socketing dies, respectively. Also, it will be noted that a socketed set screw, shown in Figure 15, will be produced having essentially the same fibrous structure and characteristics as described in my previous applications and common to the fillister screw of Figure 10, while also having the particular fibrous and other structure described in the second application including the cupped and coned end desired in a set screw.

Here, however, I preferably use the punches 11, 12, 13, 14, or other like substituted punches 44, 45, 46, 47, with the upsetting die 4, or like substituted die, in upsetting blanks for fillister screws, and also provide an improved socketing die 48 adapted with the punches aforesaid, to carry further my improved method of making such screws whereby I produce the desired fibrous structure in the head and preserve the original fibrous structure in the adjacent portion of the shank while also effecting the extrusion of the extremity of the blank shank between upsetting and socketing. Here, it will be noted that a shorter blank is used and that the shank 49 formed on the blank during upsetting is shorter than the shank illustrated in Figures 6 and 7. Further, it will be noted that the die 48 is provided not only with a socketing aperture similar to that in the die 5, but with a short shank receiving aperture 49' of the same diameter as the shank receiving aperture in the upsetting die 4, and with a communicating smaller axial aperture 50, and has a smaller knockout pin 51 in the aperture 50. Thus, during the insertion of the blank in the socketing die 48 (Figure 18), while the head and the adjacent shank portion 52 of the blank retain the desired fibrous structure, an extension of the portion 52 and of reduced diameter, herein indicated at 53 and longer than the portion 52, is formed by extrusion. Further, after the socketing operation, which is performed without appreciable extrusion, as in my prior applications, I roll thread this portion 53 and the same is of such diameter that, when this portion 53 is roll threaded as shown at 54 in Figure 20, the outside diameter of the roll threading 54 is of the proper diameter, while an exceedingly strong screw is produced, wherein, as the result of the roll threading, the threaded portion is stronger than that portion of a screw wherein the threads are cut.

Considering the operation of the machine described in carrying out my improved method and referring particularly to the structure shown in Figures 1 to 5, it will be noted that all of the mechanism including the knife, the transfer mechanism and the punches will be automatically operated from the header. More particularly, the slug is first cut off and then transferred by the knife 23 and spring 25 to the upsetting die 4, where it is acted upon successively by the punches 11 and 12 in different positions of the gate 20. Then, it is transferred by the fingers 31 to the socketing die 5, where it is next acted upon by the punches 13 and 14 in different positions of the gate 20 to effect socketing. Thus, it will be noted that the upsetting operation is caused to be very promptly followed by the socketing operation. More particularly, before any appreciable loss of the heat resulting from the heading operation, the upset blank is disposed in the socketing die 5 and socketed, in such manner as to eliminate any need for annealing. In practice, the average time between the upsetting and socketing is less than a second so that it will be evident that there will be no appreciable change in temperature or in the character of the metal between the two operations. As a result, it is not only made possible to eliminate annealing and the hazards thereof, while speeding up production, but it is also for the first time made practical to have the socketing operation performed in the same machine which performs the upsetting operation and immediately following the latter operation, with resultant economies and advantages as regards increased production, reduction of labor costs, uniformity of production, etc.

As regards the mechanism for carrying out my improved method, it will also be evident that this mechanism is of a character adapted to function effectively to perform its purposes, while also functioning quickly and with certainty in transferring the upset blank from the upsetting die to the socketing die. Moreover, it will be evident that this structure may be embodied in a standard type of header through the use of my improved die and punch blocks and the associated improved transfer and double knockout mechanism, in such manner as to produce a machine which is not materially more expensive than a usual double stroke solid die header, while adapting the latter to produce my improved product in the single machine. Here of course it will be understood that where desirable I contemplate the use of spring backed punches such as described in my application, Serial No. 601,549, and the use of air vc: s for the die apertures.

As regards the product, it will also be observed that I am able to retain the improved fibrous character of the screws claimed in my previous applications, while at the same time substantially speeding up the production of the screws and accordingly reducing the cost of the screws, whether the same are of the fillister type or of the set screw type. Moreover, as a result of my improved method of extruding the shank of a fillister screw described above in connection with Figures 18 and 19, it will be noted that it is made possible to retain the fibrous structure in and adjacent the head as desired, while also obtaining a wholly new extruded shank extension especially adapted to roll threading, and, by roll threading this shank, produce an exceedingly strong threaded portion as compared with such portions having cut threads.

While I have in this application specifically described these embodiments of my improvements, it will be understood that the same are described for illustrative purposes, and that my invention is not limited to the particular structures shown and may be embodied in other modified structures without departing from its spirit or the scope of the appended claims.

What I claim as new and desire to secure by Letters Patent is:—

1. The method of making socketed screws which consists in, upsetting the portion to be socketed in one die, quickly transferring said portion to another die, and, before the character of the metal permanently changes following upsetting, punching a coaxial socket in said portion while in said second die.

2. The method of making socketed screws which consists in, upsetting the portion to be socketed in one die, quickly transferring said portion to another die, and punching a socket of substantially uniform cross section therein while said portion is free from appreciable extrusion and before the character of the metal permanently changes following upsetting.

3. The method of making socketed screws which consists in, upsetting a blank while cold to form a head and a shank thereon, extruding said shank while unheated and maintaining the shape of said head, and working the metal of said head into a socket of substantially uniform diameter before the character of the metal permanently changes following the upsetting operation.

4. The method of making socketed screws which consists in, upsetting the portion to be socketed in upsetting mechanism, transferring said portion promptly to socketing mechanism adapted to form a socket of substantially uniform diameter in said portions, and punching a socket of substantially uniform diameter in said portion before the character of the upset metal permanently changes following upsetting.

5. The method of making socketed screws which consists in, upsetting the portion to be socketed to form a relief progressively decreasing from the maximum diameter of said portion to a minimum diameter below the bottom of the socket to be formed therein, transferring said portion promptly to socketing mechanism adapted to form a socket of substantially uniform diameter in said portion, and punching a socket of substantially uniform diameter in said portion before the character of the metal permanently changes following upsetting.

6. The method of making socketed screws which consists in, upsetting a blank to form a shank and a head portion to be socketed having a relief progressively decreasing from the maximum diameter of said portion to a minimum diameter below the bottom of the socket to be formed therein, extruding said shank while maintaining the shape of said relief, and punching a socket in said portion before the character of the metal permanently changes following upsetting and while forcing metal in advance of the punch and maintaining the same free to flow laterally to fill out said portion.

7. The method of making socketed screws which consists in, upsetting the portion to be socketed in an upsetting die while forming a relieved portion progressively decreasing from a maximum diameter to a minimum diameter below the bottom of the socket to be formed therein, transferring said portion while heated by upsetting to a socketing die adapted to be filled out during socketing, and punching a socket in said portion before the character of the metal permanently changes and while the displaced metal is forced in advance of the punch and free to flow laterally to fill out said socketing die.

8. The method of making socketed articles which consists in, upsetting the portion to be socketed while forming a blank having a head and a shank thereon, extruding the end of the shank to form an extension on the latter while maintaining said head substantially without change, and socketing said head.

9. The method of making socketed fillister screws which consists in, upsetting the portion to be socketed while forming a blank having a head and a shank thereon, extruding the end of the shank to form an extension on the latter while maintaining said head substantially without change, socketing said head, and roll threading said extruded extension.

10. The method of making socketed fillister screws which consists in, upsetting the portion to be socketed while forming a blank having a head and a shank, extending the extremity of said shank promptly following upsetting while maintaining the shape of said head, and socketing said head before the character of the metal permanently changes following upsetting.

11. The method of making socketed screws which consists in, upsetting the portion to be socketed while cold and while forming a blank having a head and a shank thereon, extruding the end of the shank to form an extension on the latter while maintaining the shape of said head, and socketing said head without appreciable extrusion, both said extruding and socketing operations being performed before the character of the metal of said portion permanently changes following upsetting.

12. The method of making socketed fillister screws which consists in, upsetting the portion to be socketed in an upsetting die while cold and while forming a blank having a head and a shank thereon, extruding the end of the shank to form an extension on the latter while forcing said head into a socketing die operation and maintaining the shape of said head, and socketing said head in said socketing die without appreciable extrusion, both said extruding and socketing operations being performed before the character of the metal of said portion permanently changes following upsetting.

13. Apparatus for making socketed articles comprising upsetting mechanism for upsetting the portion to be socketed, a socketing mechanism for forming a socket of substantially uniform diameter in said upset portion, and means for transferring said portion from the former mechanism to the latter mechanism and operating the latter before the character of the metal permanently changes following upsetting.

14. Apparatus for making socketed screws comprising upsetting mechanism, extruding and socketing mechanisms, mechanism for transferring an upset portion from said upsetting mechanism to said extruding and socketing mechanisms, and means for operating said transfer mechanism and said extruding and socketing mechanisms to transfer, extrude, and socket said portion to be socketed before the character of the metal permanently changes following upsetting.

15. Apparatus for making socketed articles comprising upsetting die and punch mechanism including a plurality of punches, socketing die and punch mechanism including a plurality of punches, and means operative in timed relation to said punches for delivering a portion to be upset to said upsetting mechanism while an upset portion is being delivered from said upsetting mechanism to said socketing mechanism.

16. Apparatus for making socketed screws comprising upsetting die and punch mechanism including a plurality of punches, socketing die and punch mechanism including a plurality of punches, means for successively operating the upsetting punches, means for successively operating the socketing punches, cutting-off mechanism delivering to said upsetting mechanism, and means operative during said delivery operation for transferring the portion to be socketed from the upsetting die to the socketing die.

17. Apparatus for making socketed screws comprising cutting off mechanism, upsetting mechanism including a die and a plurality of cooperating punches, socketing mechanism including a die and a plurality of cooperating punches, and simultaneously operative means for delivering a portion to be upset from said cutting off mechanism to said upsetting mechanism and an upset portion to said socketing mechanism.

18. Apparatus for making socketed screws comprising cutting off mechanism, upsetting mechanism having a single die and a plurality of cooperating punches, socketing mechanism having a single die and a plurality of cooperating punches, and means for delivering a portion to be socketed from said cutting off mechanism to said upsetting mechanism and then to said socketing mechanism including a cut off knife and transfer mechanism operated thereby.

19. Apparatus for making socketed screws comprising upsetting mechanism having a single die and a plurality of cooperating punches, socketing mechanism having a single die and a plurality of cooperating punches, and means for delivering a portion to be socketed to said upsetting mechanism and then to said socketing mechanism including a cut off knife and transfer mechanism operated thereby including a plurality of different transfer means delivering to different dies.

20. Apparatus for making socketed screws comprising upsetting mechanism having a single die and a plurality of cooperating punches, socketing mechanism having a single die and a plurality of cooperating punches, and means for delivering a portion to be socketed to said upsetting mechanism and then to said socketing mechanism including a cut off knife, transfer means operated thereby, and knock out mechanism cooperating to present an upset portion to said transfer means and eject a socketed portion from said socketing mechanism.

21. In an apparatus for making socketed screws, a quill, upsetting mechanism, and socketing mechanism, mechanism including a knife and fiddle bow operative to deliver a portion to be socketed from said quill to said upsetting mechanism, and transfer mechanism including transfer means operative by said knife for delivering an upset portion from said upsetting mechanism to said socketing mechanism.

22. In an apparatus for making socketed screws, a quill, upsetting mechanism, and socketing mechanism disposed in alignment, mechanism including a knife and fiddle bow operative to deliver a portion to be socketed from said quill to said upsetting mechanism, and transfer mechanism for delivering an upset portion to said socketing mechanism, said last mentioned mechanism including work gripping finger means operative by said knife, and means for directing said finger means to transfer the work from the upsetting mechanism to the socketing mechanism.

23. In an apparatus for making socketed screws, cutting off, upsetting and socketing mechanisms having aligned die apertures and mechanism including means reciprocable across in front of said apertures during delivery for delivering cut off work first to said upsetting mechanism and thereafter to said socketing mechanism before a permanent change occurs in the metal following upsetting.

24. In an apparatus for making socketed screws, cutting off, upsetting and socketing mechanisms, said upsetting and socketing mechanisms each including a single die and a plurality of cooperating punches, and mechanism for delivering cut off work first to said upsetting mechanism and thereafter to said socketing mechanism before a permanent change occurs in the metal following upsetting, said last mentioned mechanism including work gripping means delivering from said upsetting mechanism to said socketing mechanism and movable with a part of said cutting off mechanism and guiding means for said last mentioned means.

25. In an apparatus for making socketed screws, cutting off, upsetting, and socketing mechanisms, said upsetting and socketing mechanisms each including a single die and a plurality of cooperating punches, and mechanism for delivering cut off work first to said upsetting mechanism and thereafter to said socketing mechanism before a permanent change occurs in the metal following upsetting, said last mentioned mechanism including work gripping means delivering from said upsetting mechanism to said socketing mechanism and movable with a part of said cutting off mechanism, guiding means for said last mentioned means, and common knock out mechanism for said upsetting and socketing mechanisms.

26. In an apparatus for making socketed screws, a die block comprising upsetting and socketing die apertures, a punch block comprising a plurality of upsetting punches and a plurality of socketing punches, cutting-off mechanism delivering to said upsetting aperture, means for successively presenting said upsetting punches to the work in said upsetting die and successively presenting the socketing punches to the work in said socketing die, and mechanism including transfer means movable with said cutting-off mechanism for transferring the work from said upsetting aperture to said socketing aperture.

27. In an apparatus for making socketed screws, a die block comprising upsetting and socketing die apertures, a punch block comprising a plurality of upsetting punches and a plurality of socketing punches, and means for successively presenting said upsetting punches to the work in said upsetting die and successively presenting the socketing punches to the work in the latter comprising a reciprocable gate mechanism controlling the presentation of said punches, cutting-off mechanism delivering the work opposite said upsetting die aperture, and work transferring mechanism including means movable with said cutting-off mechanism to transfer the work from opposite said upsetting die aperture to said socketing die aperture between said upsetting and socketing operations.

28. In an apparatus for making socketed screws, a die block comprising upsetting and socketing die apertures, a punch block comprising a plurality of upsetting punches and a plurality of socketing punches, and means for successively presenting said upsetting punches to the work in said upsetting die and successively presenting the socketing punches to the work in the latter comprising a reciprocable gate mechanism controlling the presentation of said punches, cutting-off mechanism delivering the work opposite said upsetting die aperture, work transferring mechanism including means movable with said cutting-off mechanism transversely between positions opposite the upsetting and socketing die apertures between said upsetting and socketing operations, and knock out mechanism for ejecting the work from both the upsetting die and the socketing die upon completion of the upsetting and socketing operations.

29. Apparatus for socketing articles comprising a socketing die having a socketing aperture and having a communicating axial shank receiving aperture and an axial extension of reduced cross section communicating with said shank receiving aperture, means for forming a portion to be socketed having an upset head portion receivable in said socketing aperture and a shank receivable in said first mentioned communicating aperture, and means for forcing said portion to be socketed into said socketing die and said shank into said first mentioned communicating aperture while extruding said shank to fill said axial extension and maintaining said upset head portion substantially without change.

30. Apparatus for socketing articles comprising a socketing die having a socketing aperture and having a communicating axial shank receiving aperture and an axial extension of reduced cross section communicating with said shank receiving aperture, means for forming a portion to be socketed having an upset head portion receivable in said socketing aperture and a shank receivable in said first mentioned communicating aperture, and means for forcing said portion to be socketed into said socketing die and said shank into said first mentioned communicating aperture while extruding said shank to fill said axial extension and maintaining said upset head portion substantially without change and thereafter socketing said head portion while maintaining the same substantially free from extrusion.

31. Apparatus for socketing articles comprising a socketing die having a socketing aperture and a communicating axial shank receiving aperture and an axial extension of reduced cross section communicating with said shank receiving aperture, means for forming a portion to be socketed having an upset head portion receivable in said socketing aperture and a shank receivable in said first mentioned communicating aperture, means for forcing said portion to be socketed into said socketing die and said shank into said first mentioned communicating aperture while extruding said shank to fill said axial extension, and means for thereafter socketing said upset portion in said first mentioned die aperture while all of the portions of the screw are maintained free from extrusion.

32. Apparatus for socketing articles comprising a socketing die having a socketing aperture and a communicating axial shank receiving aperture and an axial extension of reduced cross section communicating with said shank receiving aperture, means for forming a portion to be socketed having an upset head portion receivable in said socketing aperture and a shank receivable in said first mentioned communicating aperture, means for forcing said portion to be socketed into said socketing die and said shank into said first mentioned communicating aperture while extruding said shank to fill said axial extension, and means for thereafter socketing said upset portion in said first mentioned die aperture while all of the portions of the screw are maintained free from extrusion, said extruding and socketing mechanism being operative successively before the character of the metal in said portion permanently changes following upsetting.

33. In combination, a socketing die having a die aperture of uniform cross section, a communicating axial aperture of smaller cross section, and a second aperture of smaller cross section communicating with the remote end of said first mentioned communicating aperture, a knock out pin in said last mentioned aperture, and means for forcing into said die a headed blank having a head receivable in said die aperture and a shank fitting said first mentioned communicating aperture while extruding said shank to fill out said second mentioned communicating aperture and maintaining said head substantially without change.

34. In combination, a socketing die having a die aperture of uniform cross section, a communicating axial aperture of smaller cross section, and a second aperture of smaller cross section communicating with the remote end of said first mentioned communicating aperture, a knock out pin in said last mentioned aperture, means for forcing into said die a headed blank having a head receivable in said die aperture and a shank fitting said first mentioned communicating aperture while extruding said shank to fill out said second mentioned communicating aperture and maintaining said head substantially without change, and means for thereafter socketing said head in said die aperture upon the completion of said extruding operation and while maintaining the blank free from further extrusion.

35. In combination, a plurality of stationary dies, a plurality of punches, means for actuating the latter to present them successively into register and in contact with the blanks or work pieces in the dies and perform multiple operations on a single blank or work piece while in each die, cutting off mechanism including a knife movable transversely relative to said dies to deliver a new blank to one of the same, and mechanism moving with said knife for transferring a blank from one of said dies to another after the completion of said multiple operations thereon and while delivering a new blank to said first mentioned die.

36. In combination, a plurality of stationary dies, a plurality of punches, means for actuating the latter to present them successively into register and in contact with the blanks or work pieces in the dies and perform multiple operations on a single blank or work piece while in each die, transfer means for grasping the blank or work piece and transferring it from one of said dies into register with another die after the action of the last of the plurality of punches upon the blank in said first mentioned die, and mechanism for delivering a new blank into register with said first mentioned die also operating said transfer means.

37. In combination, a plurality of stationary dies, a plurality of punches, means for actuating the latter to present them successively into register and in contact with the blanks or work pieces in the dies and perform multiple operations on a single blank or work piece while in each die, and mechanism for transferring a blank from one of said dies to another after the completion of said multiple operations thereon including a transfer member reciprocable between said dies during transfer and means for disposing said member out of the path of said punches after each transferring operation.

38. In combination, a plurality of stationary dies, a plurality of punches, means for actuating the latter to present them successively into register and in contact with the blanks or work pieces in the dies and perform multiple operations on a single blank or work piece while in each die, cutting-off mechanism delivering into register with one of said dies, and mechanism including transfer means movable with said cutting-off mechanism for grasping the blank or work piece and transferring it from said die into register with another die after the action of the last of the plurality of punches upon the blank in said first mentioned die, said means comprising a work grasping member pivotally connected to said cutting-off mechanism and cooperating guide means for said member for effecting the transfer movement thereof and thereafter disposing said member out of the path of said punches.

WILLIAM A. PURTELL.

CERTIFICATE OF CORRECTION.

Patent No. 2,093,646.     September 21, 1937.

WILLIAM A. PURTELL.

It is hereby certified that error appears in the printed specification of the above numbered patent requiring correction as follows: Page 4, second column, line 30, claim 4, for "portions" read portion; page 5, first column, line 15, claim 10, for "extending" read extruding; and line 46, claim 13, strike out the article "a"; and that the said Letters Patent should be read with these corrections therein that the same may conform to the record of the case in the Patent Office.

Signed and sealed this 18th day of January, A. D. 1938.

(Seal)

Henry Van Arsdale,
Acting Commissioner of Patents.

free from extrusion, said extruding and socketing mechanism being operative successively before the character of the metal in said portion permanently changes following upsetting.

33. In combination, a socketing die having a die aperture of uniform cross section, a communicating axial aperture of smaller cross section, and a second aperture of smaller cross section communicating with the remote end of said first mentioned communicating aperture, a knock out pin in said last mentioned aperture, and means for forcing into said die a headed blank having a head receivable in said die aperture and a shank fitting said first mentioned communicating aperture while extruding said shank to fill out said second mentioned communicating aperture and maintaining said head substantially without change.

34. In combination, a socketing die having a die aperture of uniform cross section, a communicating axial aperture of smaller cross section, and a second aperture of smaller cross section communicating with the remote end of said first mentioned communicating aperture, a knock out pin in said last mentioned aperture, means for forcing into said die a headed blank having a head receivable in said die aperture and a shank fitting said first mentioned communicating aperture while extruding said shank to fill out said second mentioned communicating aperture and maintaining said head substantially without change, and means for thereafter socketing said head in said die aperture upon the completion of said extruding operation and while maintaining the blank free from further extrusion.

35. In combination, a plurality of stationary dies, a plurality of punches, means for actuating the latter to present them successively into register and in contact with the blanks or work pieces in the dies and perform multiple operations on a single blank or work piece while in each die, cutting off mechanism including a knife movable transversely relative to said dies to deliver a new blank to one of the same, and mechanism moving with said knife for transferring a blank from one of said dies to another after the completion of said multiple operations thereon and while delivering a new blank to said first mentioned die.

36. In combination, a plurality of stationary dies, a plurality of punches, means for actuating the latter to present them successively into register and in contact with the blanks or work pieces in the dies and perform multiple operations on a single blank or work piece while in each die, transfer means for grasping the blank or work piece and transferring it from one of said dies into register with another die after the action of the last of the plurality of punches upon the blank in said first mentioned die, and mechanism for delivering a new blank into register with said first mentioned die also operating said transfer means.

37. In combination, a plurality of stationary dies, a plurality of punches, means for actuating the latter to present them successively into register and in contact with the blanks or work pieces in the dies and perform multiple operations on a single blank or work piece while in each die, and mechanism for transferring a blank from one of said dies to another after the completion of said multiple operations thereon including a transfer member reciprocable between said dies during transfer and means for disposing said member out of the path of said punches after each transferring operation.

38. In combination, a plurality of stationary dies, a plurality of punches, means for actuating the latter to present them successively into register and in contact with the blanks or work pieces in the dies and perform multiple operations on a single blank or work piece while in each die, cutting-off mechanism delivering into register with one of said dies, and mechanism including transfer means movable with said cutting-off mechanism for grasping the blank or work piece and transferring it from said die into register with another die after the action of the last of the plurality of punches upon the blank in said first mentioned die, said means comprising a work grasping member pivotally connected to said cutting-off mechanism and cooperating guide means for said member for effecting the transfer movement thereof and thereafter disposing said member out of the path of said punches.

WILLIAM A. PURTELL.

---

CERTIFICATE OF CORRECTION.

Patent No. 2,093,646. September 21, 1937.

WILLIAM A. PURTELL.

It is hereby certified that error appears in the printed specification of the above numbered patent requiring correction as follows: Page 4, second column, line 30, claim 4, for "portions" read portion; page 5, first column, line 15, claim 10, for "extending" read extruding; and line 46, claim 13, strike out the article "a"; and that the said Letters Patent should be read with these corrections therein that the same may conform to the record of the case in the Patent Office.

Signed and sealed this 18th day of January, A. D. 1938.

(Seal)

Henry Van Arsdale,
Acting Commissioner of Patents.

CERTIFICATE OF CORRECTION.

Patent No. 2,093,646.  September 21, 1937.

WILLIAM A. PURTELL.

It is hereby certified that error appears in the printed specification of the above numbered patent requiring correction as follows: Page 4, second column, line 30, claim 4, for "portions" read portion; page 5, first column, line 15, claim 10, for "extending" read extruding; and line 46, claim 13, strike out the article "a"; and that the said Letters Patent should be read with these corrections therein that the same may conform to the record of the case in the Patent Office.

Signed and sealed this 18th day of January, A. D. 1938.

(Seal)  Henry Van Arsdale,
Acting Commissioner of Patents.